(12) United States Patent
Possamai (10) Patent No.: US 9,764,437 B2
(45) Date of Patent: Sep. 19, 2017

(54) DEVICE AND METHOD FOR POSITIONING A WORKING TOOL INSIDE A PREDETERMINED WORK AREA

(71) Applicant: Domenico Possamai, Oderzo (IT)

(72) Inventor: Domenico Possamai, Oderzo (IT)

(73) Assignee: Domenico Possamai, Oderzo (IT)

( * ) Notice: Subject to any disclaimer, the term of this patent is extended or adjusted under 35 U.S.C. 154(b) by 173 days.

(21) Appl. No.: 14/919,355

(22) Filed: Oct. 21, 2015

(65) Prior Publication Data
US 2016/0114442 A1    Apr. 28, 2016

(30) Foreign Application Priority Data
Oct. 23, 2014    (IT) .............................. PN2014A0055

(51) Int. Cl.
*B23Q 1/48* (2006.01)
*B25J 9/10* (2006.01)
*B23Q 1/54* (2006.01)
*B23Q 3/18* (2006.01)

(52) U.S. Cl.
CPC ............. *B23Q 1/48* (2013.01); *B23Q 1/5462* (2013.01); *B23Q 3/18* (2013.01); *B25J 9/106* (2013.01); *B25J 9/1065* (2013.01)

(58) Field of Classification Search
CPC .............. B23Q 1/48; B23Q 3/18; B25B 11/00
See application file for complete search history.

(56) References Cited

U.S. PATENT DOCUMENTS

| 5,184,985 | A  | * | 2/1993 | Varinelli | B23D 41/02 409/265 |
| 6,557,235 | B1 |   | 5/2003 | Katz et al. | |
| 6,745,804 | B2 | * | 6/2004 | Welsh | B25H 1/04 108/131 |
| 8,484,779 | B1 | * | 7/2013 | Bradwell | A61G 13/0027 108/24 |
| 2003/0051336 | A1 |  | 3/2003 | Helm et al. | |
| 2014/0203485 | A1 | * | 7/2014 | Forlong | B23K 37/0461 269/309 |

(Continued)

FOREIGN PATENT DOCUMENTS

DE    19908692 A1    10/2000

OTHER PUBLICATIONS

Jun. 8, 2015 Partial Translation of Written Opinion issued in Italian Patent Application No. 20140055.

*Primary Examiner* — Lee D Wilson
(74) *Attorney, Agent, or Firm* — Oliff PLC (57) ABSTRACT

A device for moving a working tool including a support structure provided with a first and a second rectilinear guide, a first and a second support trolley, a first and a second support arm joined to each other and compass-articulated and pivoted respectively on the first and second trolley. The first support arm includes a first element and a second element that are parallel to each other and of equal length, each having a first end rotatably hinged on a respective first and second part projecting from the first trolley and a second end rotatably hinged on connecting brackets between the second ends, in such a way that the connection axis between the first ends and the connection axis of the second ends are parallel to the aforementioned longitudinal axis in any working condition.

10 Claims, 5 Drawing Sheets

(56) References Cited

U.S. PATENT DOCUMENTS

2016/0016267 A1* 1/2016 Beatty ............... B23K 37/0452
  29/559
2016/0114442 A1* 4/2016 Possamai ................ B25J 9/106
  248/277.1

* cited by examiner

DEVICE AND METHOD FOR POSITIONING A WORKING TOOL INSIDE A PREDETERMINED WORK AREA

TECHNICAL FIELD OF THE INVENTION

The present invention generally refers to a device and to a method for positioning a working tool inside a predetermined work area. In particular, the device comprises multiple arms that are joined together and articulated on a frame of a machine adapted to work sheets or plates, e.g. made of metal or wood. Different work tools can be employed, for example a punch for obtaining shaped notches or other tools for specific mechanical processing, such as a laser head.

STATE OF THE PRIOR ART

In the field of machinery that effects work on metal sheets or plates, many different apparatuses have been known for some time which move and position a working tool above a piece to be worked.

A first type of these machines uses positioning mechanisms for the working tool characterized by a bridge structure, H-shaped or T-shaped. In these machines, the working tool is positioned by arranging two rectilinear motions which are carried out along two directions, generally perpendicular to each other, on a horizontal plane. Often, in addition to the motion in these first two directions, a third direction is added which generally is perpendicular to the plane identified by said first two motion directions, i.e. vertical with respect to the aforesaid horizontal plane.

The machines of a second type, in which the invention described hereinbelow lies, use a support structure for the working tool, comprising a pair of arms rotatably joined together at first ends and hinged by means of second ends on the load-bearing structure of a machine. This structure type can be generally indicated with the term "compass-shaped support."

An example of this second type machine is represented in the United States patent application US 2003/051336A1, in which a device is described for positioning a tool inside a predetermined work area.

Such device comprises two guides, parallel to each other, mounted on a support surface. A support trolley is hinged on each guide, and such support trolley slides due to an actuator, for example a motor which moves a belt fixed to said support trolley and wound on pulleys mounted at the end of said guides. An arm is hinged by means of a respective first end on each support trolley, while the respective second ends of said arms are joined together at a fulcrum point in a manner so as to form a "compass-shaped structure." On the fulcrum of said second ends, a working tool is rotatably supported. The rotation is actuated by means of a mandrel which carries the tool. In this manner, small masses can be moved without the necessary assistance of additional, complex mechanisms for reaching all the working areas of the piece.

The main drawback of this device lies in the fact that the working tool is supported on the compass-shaped structure in a rotatable manner. Therefore, in the case of a tool that carries out non-circular processing, it is necessary to control and rotate the tool so that it is always oriented in the correct way, established by the desired processing. However, this requires the need for servomotors and commands for controlling and positioning the tool in a correct manner during the entire processing cycle. Consequently, the device is always complex and relatively heavy, especially at the aforesaid fulcrum.

SUMMARY OF THE INVENTION

The technical problem underlying the present invention is therefore that of providing a device which is capable of maintaining the tool always oriented in a certain manner with respect to the work surface during the entire processing cycle. In addition, the device must be structurally simple and provided with lightness, especially in the area of the tool.

Therefore, a first objective of the invention is to provide for an apparatus for positioning a working tool so as to not change the orientation of said working tool with respect to the piece to be worked.

In addition, a second objective is to provide for the possibility to modify, in a simple way, the orientation of the working tool with respect to the piece to be worked, then maintaining constant said orientation regardless of the position of such working tool.

A further object of the present invention is a method for positioning and moving a working tool above a workpiece.

Still a further objective of the present invention is a process through which the positioning method is applied, due to the device for positioning a working tool.

BRIEF DESCRIPTION OF THE FIGURES

Further characteristics and advantages of the device for positioning a working tool inside a predetermined work area, object of the invention, will become more evident from the following description of several embodiments given as a merely non-limiting example with reference to the following figures, in which.

DETAILED DESCRIPTION OF THE INVENTION

The idea underlying the present invention is to exploit the geometric characteristics of the parallelograms in order to obtain a device for positioning a working tool, for example, above the surface of a metal sheet to be processed. The device for positioning a working tool, object of the present invention, is capable of modifying the position of the working tool with respect to a piece to be worked, however maintaining constant the orientation of said working tool with respect to the piece itself regardless of the point at which the working must be carried out.

This result is obtained without requiring servomotors dedicated to this function.

The device, object of the present invention, can be advantageously employed, for example, in punching processing with non-circular shapes, or in other words shapes that vary if subjected to rotation around an axis orthogonal to the work surface.

In this case, the device for positioning a working tool must provide for the possibility of compensating for the modification in the orientation of the working tool with respect to the surface to be worked induced by the rotation of arms.

After numerous experimental tests, it was found that, by obtaining a first support arm 8 of the compass-shaped structure with a parallelogram construction, it is possible to obtain a device 100 for positioning a working tool which allows maintaining constant the orientation of said working tool 10 regardless of the point at which the processing must be carried out.

Figure 1:
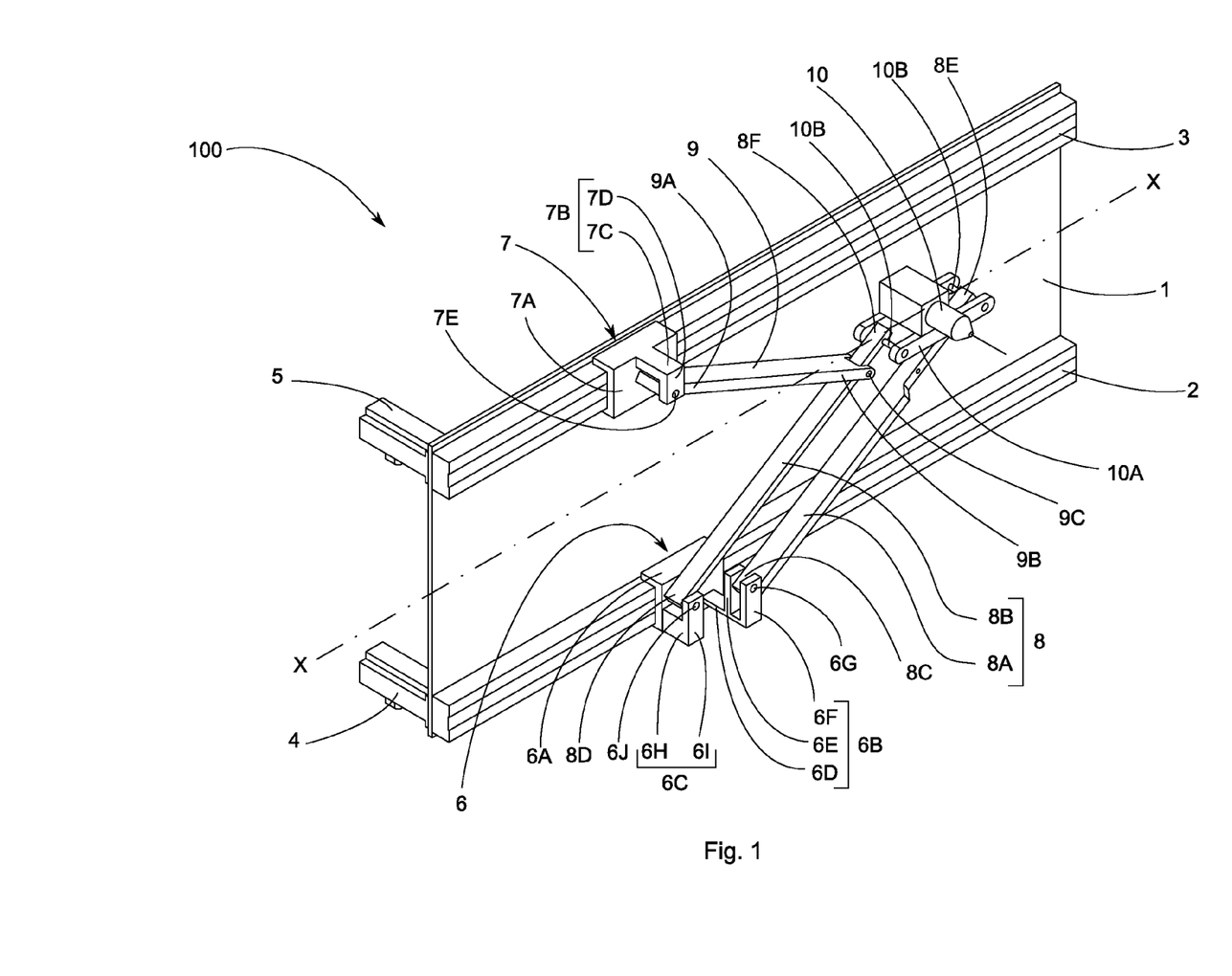
FIG. 1 shows, in a bottom axonometric view, a device for positioning a working tool inside a predetermined work area.

With reference to FIG. 1, the device 100 for positioning a working tool 10 comprises a support structure 1 which is longitudinally extended along an axis X-X, a first rectilinear guide 2 and a second rectilinear guide 3 parallel to each other. Said rectilinear guides 2 and 3 are preferably mounted on the edges of a first surface of said support structure 1 directed towards a piece to be worked.

On a second surface of said support structure 1, opposite said first surface, fixing elements 4, 5 are present that are adapted to install said device 100 for positioning on frames (not shown), on more complex machinery (not shown), directly on the ceiling or vertically on the wall.

Said rectilinear guides 2 and 3 are shaped in a manner so as to allow the slidable engagement respectively of a first support trolley 6 and of a second support trolley 7. Said support trolleys are driven by respective servomotors (not shown) by means of known mechanisms such as, merely by way of example, toothed belts or threaded shafts which are engaged in corresponding cavities threaded in the body of said support trolleys. These embodiment details, being known, are neither described nor represented in the accompanying drawings.

In addition, the device 100 for positioning a working tool comprises sensors (not shown) for detecting the position of said trolleys. Said sensors can be mounted, for example, on the same trolleys 6 and 7 or along the rectilinear guides 2 and 3.

Figure 2A:
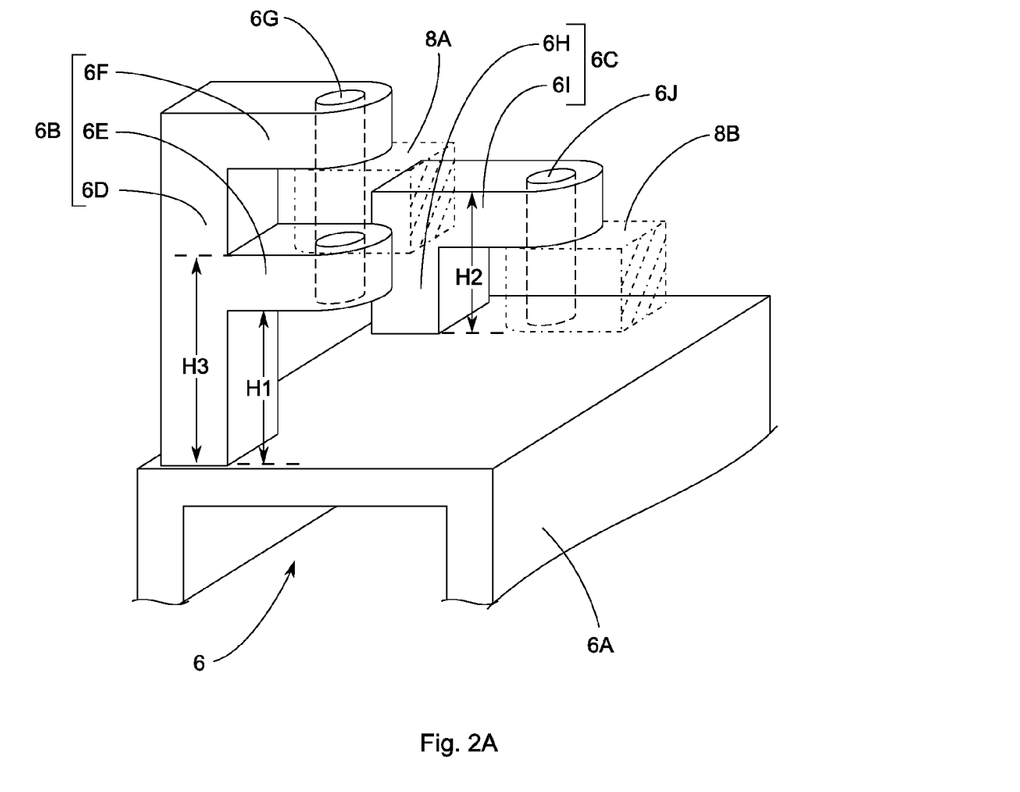
FIG. 2A shows a partial axonometric view of a detail of a support trolley on which a support arm for a working tool is mounted.

In a first embodiment, illustrated in detail in the partial view of FIG. 2A, the first support trolley 6 comprises a body 6A, preferably having a generally upside-down U-shaped section, adapted to be engaged on the first rectilinear guide 2. A first projecting part 6B and a second projecting part 6C are extended from said body 6A in a direction generally orthogonal thereto.

Said first projecting part 6B generally has an "F" shape with a stem 6D perpendicularly fixed to said body 6A, a first branch 6E and a second branch 6F orthogonal to said stem 6D and projecting towards the second rectilinear guide 3 (FIG. 1). Each of said branches 6E, 6F has a through hole in which a pin 6G is inserted. Said pin 6G rotatably retains a first element 8A of said first support arm 8 of the compass-shaped structure, both described hereinbelow.

Said second projecting part 6C generally has an upside-down "L" shape with a stem 6H perpendicularly fixed to said body 6A and a branch 6I, orthogonal to said stem 6H, projecting towards said second rectilinear guide 3 (FIG. 1). In other words, the second projecting part 6C corresponds with half of the "F" shape of the first projecting part 6B, i.e. with the branch 6E and with the stem portion 6D which terminates at the branch 6E.

Said arm 6I has a through hole in which a pin 6J is engaged. Said pin 6J is also engaged in a corresponding hole (not shown) on said body 6A and rotatably retains a second element 8B of said first support arm 8 of the compass-shaped structure described hereinbelow.

Figure 3A:
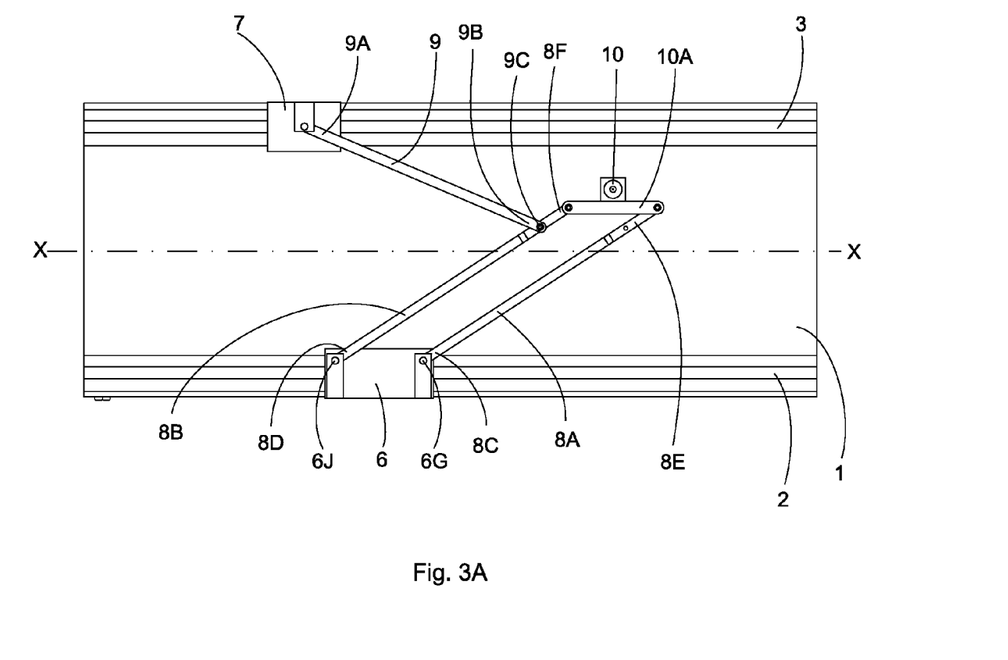
FIGS. 3A, 3B, 3C and 3D show plan views of four positions which the positioning device can assume in the working steps.
Figure 3B:
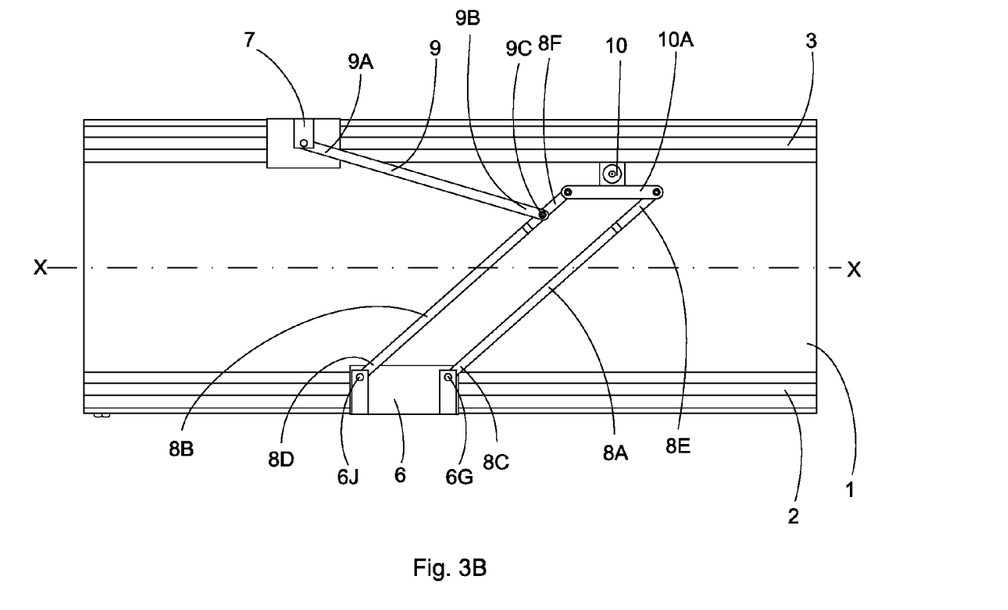
Figure 3C:
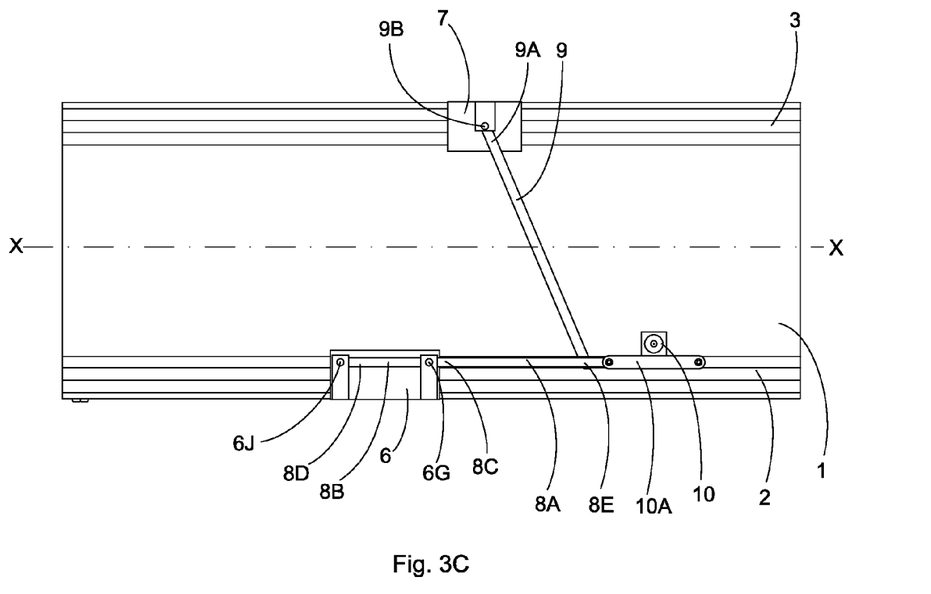

The distance H1 (FIG. 2A) between the branch 6E and the body 6A of the movable trolley 6 is such to allow said element 8B hinged on the second projecting part 6C to freely move below said branch 6E when said second element 8B is rotated until it is parallel with said first rectilinear guide 2, as shown in FIG. 3C.

Analogously, the height H2 of the projecting part 6B does not exceed the height H3 of the branch 6E. In this manner, the first element 8A can freely move, rotating above the second projecting part 6C.

The second support trolley 7 (FIG. 1) comprises a body 7A preferably with generally upside-down U-shaped section and adapted to be engaged on the second rectilinear guide 3, A projecting part 7B is extended in a direction generally orthogonal to said body 7A (FIG. 1).

Said projecting part 7B generally has an upside-down "L" shape with a stem 7C perpendicularly fixed to said body 7A and a branch 7D orthogonal to said stem 7C and directed towards said first rectilinear guide 2 (FIG. 1). Said arm 7C has a through hole in which a pin 7E is engaged. Said pin 7E is also engaged in a corresponding hole (not shown) obtained on said body 7A and rotatably retains a second support arm 9 of the compass-shaped structure described hereinbelow.

Figure 2B:
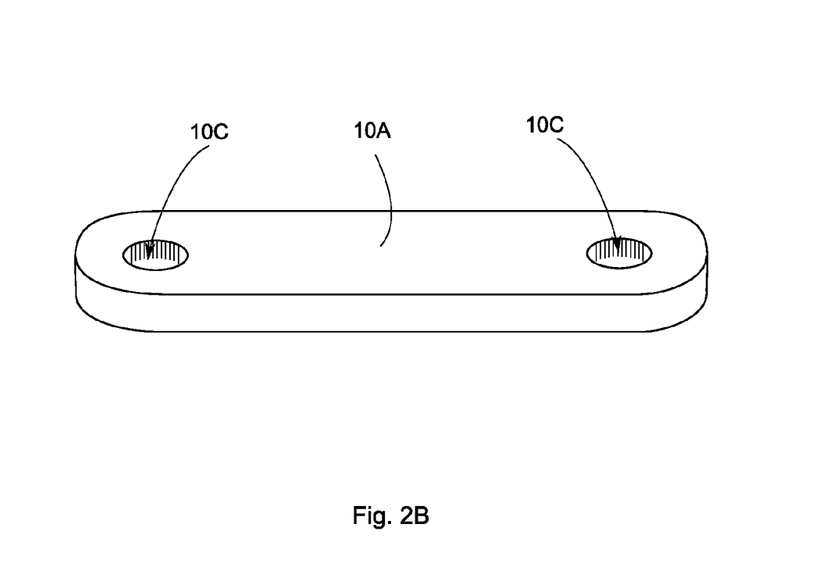
FIG. 2B shows an axonometric view of a support bracket for a working tool.

As anticipated, said first support arm 8 of the compass-shaped structure comprises a first element 8A and a second element 8B of equal length (FIG. 1). First ends 8C and 8D respectively of said first element 8A and second element 8B have through holes in which said pins 6G and 6J are respectively engaged which are adapted to fix said first element 8A and second element 8B on said first support trolley 6, Second ends 8E and 8F respectively of said first element 8A and second element 8B show through holes in which pins 10B are engaged that are adapted to fix brackets 10A by means of through holes 10C (FIG. 2B). In addition, said second element 8B, i.e. the element of the arm 8 closest to the second support arm 9, has a through hole (not shown) in which a pin 9C is engaged for joining said second support arm 9 with said second element 8B.

The second support arm 9 has, at a first end 9A, a through hole (not shown) in which said pin 7E is engaged and, as stated above, at a second end 9B it has a second through hole (not shown), in proximity to its second end 8F, in which a pin 9C is engaged that is adapted to join said support arm 9 with said second element 8B.

The working tool 10 can be a punch, a laser cutting head or any other device suitable for executing a required processing on the plate or on the sheet, e.g. made of metal or wood. This tool is fixed on said brackets 10A.

An electronic control unit ECU, not shown, controls the movement of actuators (not shown) which drive said support trolleys 6, 7 in order to position working tool 10 at the required point of the work area.

Indeed, with the variation of the position of said trolleys 6, 7 along the rectilinear guides 2, 3, the compass-shaped structure formed by said support arms 8 and 9 can make said working tool 10 assume a generic position inside the work area, maintaining constant the orientation thereof with respect to the longitudinal axis X-X due to the parallelogram arrangement of the elements 8A and 8B.

In other words, the articulation between the elements 8A, 8B and the brackets 10A allows the brackets themselves to remain aligned with the longitudinal axis X-X independent of the movement of the trolleys 6, 7.

In particular, as visible in FIG. 3A, the two pins 6G and 6J are aligned parallel with the direction of the first rectilinear guide 2, Due to the fact that said two elements 8A and 8B have the same length and that the center distance between the holes 10C on the support bracket 10A is equal to the center distance between the pins 6G, 6J, an articulated parallelogram structure is formed so that also the support bracket 10A is oriented, and will always remain oriented, parallel to said rectilinear guides 2 and 3.

FIGS. 3B, 3C show two situations in which the working tool 10 is close to the rectilinear guides 2 and 3.

In the plan view of FIG. 3B, the working tool 10 leans against the rectilinear guide 3 and it is even more evident that, due to the parallelogram structure of the first support arm 8 of the compass-shaped structure, the support bracket 10A is oriented parallel to said rectilinear guide 3.

In FIG. 3C, in which the support bracket 10A is superimposed on the rectilinear guide 2, the parallelism is even more evident between the direction along which the pins 6G, 6J of the support trolley 6 are aligned, the direction of the two elements 8A and 8B that are superimposed on each other and the direction of the support bracket 10A.

Figure 3D:
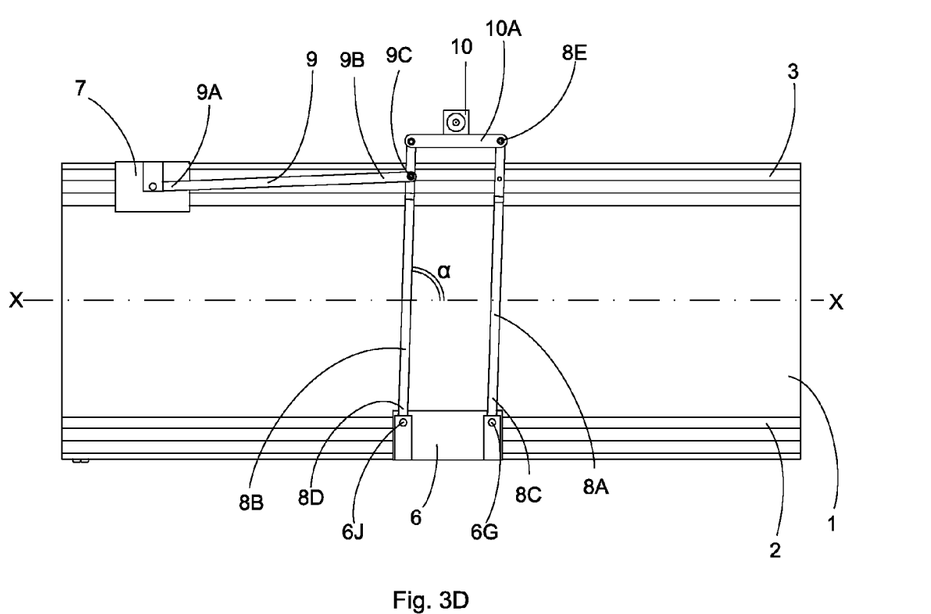

Indeed, FIG. 3D shows a situation according to an embodiment variant in which the length of the elements 8A, 8B is such that when these are substantially arranged at an angle α of 90° with respect to the axis X-X, the working tool 10 is situated beyond the edges of the support structure 1. It will be clear to one skilled in the art that by increasing the length of the elements 8A, 8B with respect to the size of the support structure 1 in the direction orthogonal to the axis X-X, the working tool 10 will project beyond the edges of the support structure even for smaller size angles. In this figure, it is possible to appreciate that the support bracket 10A is in any case parallel to the second rectilinear guide 3, and consequently it is parallel to the direction between the two pins 6G and 6J which are aligned parallel to the direction of the first rectilinear guide 2, Therefore, it is possible to enlarge the work area as desired without disrupting the orientation of the working tool 10.

Figure 4A:
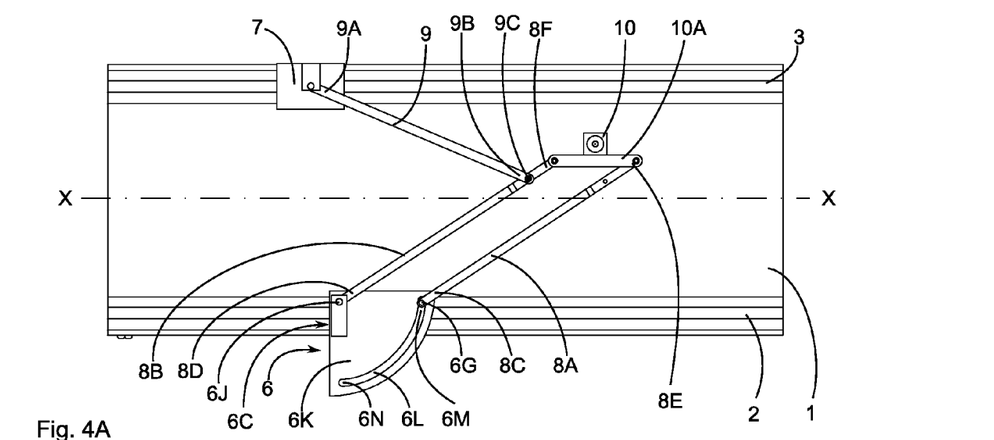
FIGS. 4A, 4B and 4C show three plan views of a second embodiment of the device for positioning a working tool with said working tool in three different positions.
Figure 4B:
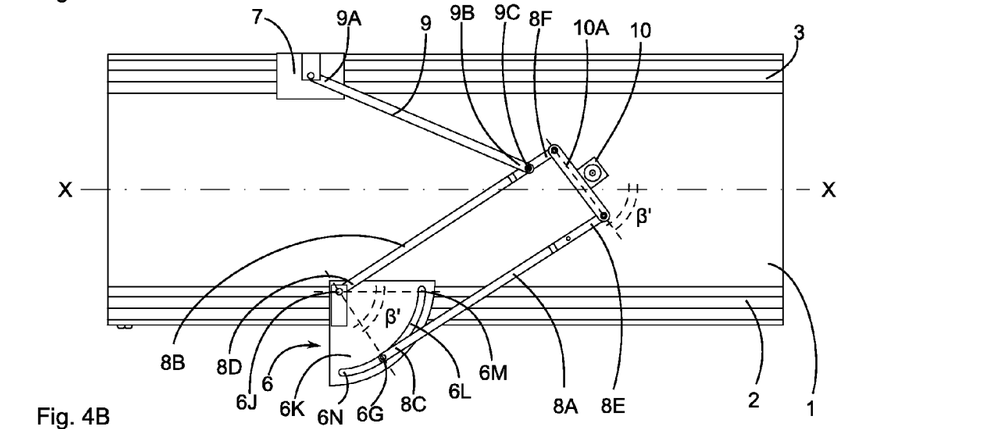
Figure 4C:
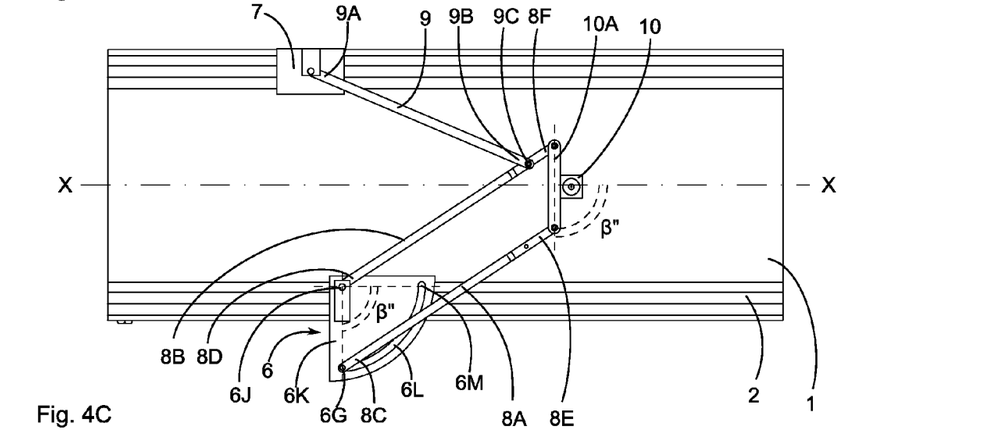

A further embodiment variant of the present invention is shown in FIGS. 4A-4C. Here, analogous to the embodiment described above, the first support trolley 6 comprises the projecting part 6C in which said pin 6J is engaged. On the other hand, unlike the preceding cases, the first support trolley 6 has a surface 6K sufficiently wide to house a slot 6L.

In particular, said slot 6L is extended as an arc, centered on said pin 6J engaged in said second projecting part 6C, from a first end 6M which lies on a line parallel to said longitudinal axis X-X and passing through said pin 6J, to a second end 6N directed towards the exterior of the support structure 1, The slot preferably has a 90° size.

In other words, the first end 8C of the first element 8A and the first end 8D of the second element 8B are each rotatably connected to the first support trolley 6 by means of respective pins 6G, 6J, wherein said pin 6J of the second element 8B is fixed and said pin 6G of the first element 8A moves along said arc-shaped slot 6L centered on said pin 6J of said second element 8B, and which is extended from a first end 6M, lying on a straight line parallel to the longitudinal axis X-X and passing through said pin 6J, to a second end 6N directed towards the exterior of the support structure 1.

Now, the first end 8C of said first element 8A is rotatably engaged on a pin 6G which slides along said guide 6L under the action of actuators (not shown) controlled by an electronic control unit ECU.

Alternatively, said first end 8C is rotatably engaged, in a manner analogous to the above-described embodiment, on a pin 6G coupled between branches 6E, 6F of a projecting part 6B have F shape analogous to that described above. Also in this case, the motion of said projecting structure 6B, along said slot 6L, is adjusted by means of actuators (not shown) controlled by said electronic control unit ECU.

In FIG. 4A, said first end 8C of said first element 8A is positioned at the end 6M of said slot 6L closest to the longitudinal axis X-X of said support structure 1. This situation is analogous to that described for the embodiment and shown in FIG. 3A: said pins 6G and 6J are parallel to the direction of the first rectilinear guide 2 and to said longitudinal axis X-X. Due to the parallelogram structure of the first support arm 8 of the compass-shaped structure, also the support bracket 10A is parallel to the longitudinal axis X-X.

In FIG. 4B, said end 8C of said first element 8A is positioned at an intermediate point between the two ends 6M, 6N of said slot 6L. The angle β' comprised between the direction of the rectilinear guide 2 and the direction of the line passing through the pins 6G-6J has the same size as the angle β' comprised between the longitudinal axis X-X and the line passing through the centers of the holes 10C of said support bracket 10A. In this case, the working tool 10 rotates on its axis perpendicular to the work surface in order to modify the processing with respect to that obtainable with the configuration of FIG. 4A.

Finally, in FIG. 4C a third position is shown in which the working tool 10 is rotated an angle β" equal to 90° with respect to the axis X-X following the movement of said pin 6G at the end 6N of the guide 6L, Analogous to FIG. 4B, also in this case it is possible to further modify the processing with respect to that of FIG. 4A.

Once the tilt angle β, β' and β" of the pins 6G, 6J is set with respect to the longitudinal axis X-X, the working point can be moved, as in the case of the first embodiment, by the ECU which modifies the position of the support trolleys 6 and 7 by controlling actuators dedicated thereto without modifying the tilt of the support bracket 10A and hence of the working tool 10.

Further object of the present invention is a method for positioning/moving a working tool 10 above a workpiece, comprising the steps of:

a. providing an apparatus 100 for positioning/moving a working tool 10 comprising a compass-shaped support structure 1 provided with a first 8 and a second 9 support arm having first ends respectively 8C, 8D, 9A connected to a corresponding first 6 and a second 7 support trolley which respectively slide on a first rectilinear guide 2 and a second rectilinear guide 3 which are extended rectilinear and parallel along a longitudinal axis X-X, said first 8 and second 9 support arm having corresponding second ends 8E, 8F, 9B connected to each other so as to support said working tool;

b. moving said working tool 10 to the requested working point, maintaining constant its tilt or orientation with respect to said longitudinal axis X-X along which said trolleys move.

It must be considered that the step b) of moving the working tool 10 is obtained without the aid of means for correcting the tilt or orientation of the tool. In other words, such step is achieved by means of a support structure consisting of an articulation of arms which maintains a unique and constant orientation of the working tool with respect to the longitudinal axis X-X during the movement of the support structure.

Preferably, the support structure 1 is that described above, hence it will not be newly discussed hereinbelow.

In particular said second step b) in turn comprises the following steps:
i. instructing a command and control program with the coordinates of a position that the working tool 10 must assume;
ii. calculating the positions of the support trolleys 6, 7 along the respective rectilinear guides 2, 3 corresponding with the coordinates of the new work position 10;
iii. detecting the current position of the working tool 10 as a function of the position of the support trolleys 6, 7 along the respective rectilinear guides 2, 3;
iv. calculating the respective movements for the support trolleys 6, 7 which are necessary for having the working tool 10 pass from the current position to the work position;
v. moving the support trolleys 6, 7 in a way such that they reach the respective positions along the rectilinear guides 2, 3 corresponding with the new position of the working tool 10, maintaining constant its tilt or orientation with respect to said longitudinal axis X-X along which said trolleys move.

Once the processing on a pre-established point, as just explained, has terminated, the operations i)-v) are repeated for successive pre-established processing set in the command and control program.

In accordance with an embodiment variant, the aforesaid method comprises a step for adjusting the orientation of the working tool 10 with respect to the longitudinal axis X-X. This adjustment is obtained if it is desired to vary the orientation of the tool with respect to the longitudinal axis X-X. Indeed, if for a particular processing it is necessary to modify the orientation of the working tool in order to obtaining processing oriented differently with respect to said longitudinal axis X-X, the method comprises a step of moving the first end 8C of the first element 8A along an arc whose rotation center is defined by the first end 8D of the second element 8B of the first support arm 8.

In particular, such adjustment occurs by means of the arrangement of the slot 6L described above with reference to the variant of the support structure 1 for the working tool 10. Hence, the description of such slot will not be newly discussed herein; reference is made to the above discussion.

In particular, the method according to this variant comprises the sub-steps of:
a. instructing the command and control program with values representative of the tilt angle which the working tool 10 must assume with respect to said longitudinal axis X-X for the pre-established processing;
b. calculating the position of the pin 6G along the slot 6L corresponding with said tilt of the working tool 10;
c. detecting the current tilt angle of the working tool 10 based on the position of the pin 6G along the slot 6L;
d. calculating the movement of the pin 6G that is necessary for making said pin 6G assume the position for obtaining the tilt required for the working tool 10;
e. controlling the actuators in order to move the pin 6G from the current position to the desired position.

Once the working tool 10 is positioned, the support trolleys first 6 and second 7 are moved as described above in order to move the working tool along the work surface, in a manner such that it can achieve the processing where desired and maintaining constant the new set tilt or orientation.

From the discussion up to now, it is clear that all the drawbacks tied to the prior art, presented above, have been resolved. Indeed, due to the selection of the parallelogram geometry, it is possible to maintain constant the orientation of the working tool regardless of the rotation of the support arm necessary for bringing the working tool to the required point. In addition, it is possible with a device 100 with simple structure to move the operation point of a working tool 10 and the particular configuration allows eliminating inaccessible areas between the two rectilinear guides 2, 3. In addition, due to the support trolley provided in the second embodiment variant, it is possible to modify the orientation of the working tool 10 according to the processing requirements in the case of processing with tools that are not symmetric with respect to a rotation on the axis thereof.

In addition, the movement structure is very simple since it avoids having to install motorized control mechanisms for the constant, continuous correction of the orientation of the working tool in order to always maintain it with the same orientation necessary for repeating the desired processing in the same manner.

A further advantage which derives from the structure of the device, object of the present invention, is the possibility of being vertically installed, This makes it suitable, for example, for moving a head for the laser incision of series numbers on automobile windshield glass, Indeed, with this solution, delicate operations are not required for making the windshield passes from the vertical position, in which it is normally stored, to the horizontal work position and vice versa at the end of the processing, The two operations for changing the tilt of the glass, carried out with coupling means equipped with sucker, can place the integrity of the windshield at risk.

Further variants of the present invention can be readily made by one skilled in the art, without departing from the protective scope of the following claims. For example, the size of the surface 6K and consequently the length of the groove 6L can be enlarged so as to allow wider rotations of the working tool 10.

The invention claimed is:

1. A device for moving a working tool comprising:
   a support structure for said tool provided with
   a first rectilinear guide and a second rectilinear guide parallel to each other along a longitudinal axis and on which slide respectively
   a first support trolley and a second support trolley driven by respective actuators controlled by an electronic control unit ECU;
   a first support arm and a second support arm compass articulated and pivoted respectively to said first carriage and said second carriage through corresponding first ends and joined to each other via a corresponding second end;
   wherein
   said first support arm comprises a first element and a second element (8B) parallel and of equal length to each other, each having a first end rotatably hinged on a respective first and second part projecting from said first carriage and a second end rotably hinged on connecting brackets between said second ends, in such a way that the connection axis between said first ends and the connection axis between said second ends are parallel to said longitudinal axis in any working condition.

2. The device for moving a working tool according to claim 1, wherein each of the first end of the first element and the first end of the second element are rotatably connected to the first support trolley by means of respective pins, wherein said pin of second element is fixed and said pin of first element moves along an arc shaped slot centered on said pin of said second element, said slot extending from a first end, laying on a straight line parallel to longitudinal axis and passing through said pin, to a second end toward the outside of the support structure.

3. The device for moving a working tool according to claim 1, wherein said first projecting part is generally "F" shaped and comprises a stem perpendicularly fixed to said support trolley, a first branch and a second branch orthogonal to said stem and extending toward the second rectilinear guide and second projecting part has a general upside down "L" shape comprising a stem extending perpendicularly from said support trolley and a branch perpendicular to said stem and projecting toward the second rectilinear guide.

4. The device for moving a working tool according to claim 1, wherein said second support arm is connected to said second support trolley by means of a projecting part having a general upside down "L" shape and comprising a stem extending perpendicularly from said second support trolley and a branch perpendicular to said stem and projecting toward the first rectilinear guide.

5. The device for moving a working tool according to claim 1, wherein the second support arm is hinged close to the second end of the second element and said second end of said second element is rotatably connected to the second end of first element by means of said connecting brackets.

6. The device for moving a working tool according to claim 1, wherein said working tool is fixed on said supporting brackets.

7. A method for moving a working tool above a workpiece comprising the steps of:
  a) providing a device for positioning/moving a working tool comprising a compass shaped support structure provided with a first and a second arm respectively having first ends connected to a corresponding first and second support trolley sliding respectively on a first guide and a second guide extending rectilinear and parallel to a longitudinal axis, said first and second arm having corresponding second ends connected to each other so to support said working tool;
  b) moving said working tool to the requested working point, maintaining constant its inclination or direction relative to said longitudinal axis along which move said support trolley.

8. The method according to claim 7, wherein said moving step is achieved by means of a support structure consisting in articulated arms which maintain the direction of the working tool unique and constant with respect to axis while the support structure moves.

9. The method according to claim 7, wherein said step of positioning the working tool comprises a step in which the first end of the first element is moved along an arc which rotation center is defined by the first end of the second element of the first arm.

10. Process for working a flat plate comprising the positioning of the working tool in accordance with claim 7.

* * * * *